(12) United States Patent
Katsuda

(10) Patent No.: US 6,768,712 B2
(45) Date of Patent: Jul. 27, 2004

(54) OPTICAL DISK HAVING INDIVIDUAL RECOGNIZING FUNCTION

(75) Inventor: Shinichi Katsuda, Tokyo (JP)

(73) Assignee: NEC Corporation, Tokyo (JP)

(*) Notice: Subject to any disclaimer, the term of this patent is extended or adjusted under 35 U.S.C. 154(b) by 285 days.

(21) Appl. No.: 10/119,744

(22) Filed: Apr. 11, 2002

(65) Prior Publication Data
US 2002/0150031 A1 Oct. 17, 2002

(30) Foreign Application Priority Data
Apr. 12, 2001 (JP) ........................................ 2001-113503

(51) Int. Cl.$^7$ ................................................ G11B 7/24
(52) U.S. Cl. ................................ 369/275.3; 369/53.41; 369/53.44
(58) Field of Search .......................... 369/275.3, 275.4, 369/53.44, 47.47, 47.48, 47.49, 47.22, 47.21, 59.23, 277, 288, 283, 286, 275.1, 53.41, 53.37, 275.2; 386/95, 125

(56) References Cited

U.S. PATENT DOCUMENTS 6,600,707 B2 * 7/2003 Tsukada ................... 369/47.22
6,600,716 B1 * 7/2003 Kondo ..................... 369/275.3
6,618,350 B2 * 9/2003 Sasaki et al. ............ 369/275.4

FOREIGN PATENT DOCUMENTS

JP      JP 2000-163883 A      6/2000

* cited by examiner

Primary Examiner—Ali Neyzari
(74) Attorney, Agent, or Firm—Sughrue Mion, PLLC

(57) ABSTRACT

Film forming areas for recording main information are formed on surfaces on which two substrates (11a, 11b) are adhered to an adhesive layer (3). An inner-circumference portion (18) adjacent to the film forming area as a main-information area (12a, 12b) of the substrate has an individual recognizing area (4a) for read only on an optical disk (10), to which identification information for uniquely recognizing the optical disk is recorded. The identification information is formed by recording a pattern having a predetermined difference in tint to the individual recognizing area on the optical disk by printing, before adhering the two substrates to the adhesive layer. The individual recognizing area on the optical disk may be provided at an outer-circumference portion adjacent to the film forming area as the main-information area on the substrate.

15 Claims, 4 Drawing Sheets

OPTICAL DISK HAVING INDIVIDUAL RECOGNIZING FUNCTION

BACKGROUND OF THE INVENTION

1. Field of the Invention

The present invention relates to an optical disk which is formed by adhering two surfaces for forming information to an adhesive layer. More particularly, the present invention relates to an optical disk having an individual recognizing function, which can be managed as a product easily and effectively and in which the falsification can be prevented.

2. Description of the Related Art

Distribution media such as an optical disk are widely used due to the large capacity and the low cost for forming pits. In particular, various applications are proposed with a CD (Compact Disk) and a DVD (Digital Video Disk) by using the large capacity thereof.

In accordance with the large capacity for storing data in the optical disk, a variety of copy managements are proposed so as to prevent an easy copy. However, hacking causes heavy damage to copy managements all over the world.

Under such a situation, data is recognized every disk and an illegal copy is prevented. Further, the management for each optical disk is regarded as important for improving the protection of contents, the higher copy management, and the security.

Referring to FIG. 1, an optical disk 110 is used as an optical disk having the above-mentioned individual recognizing function according to the related art. The optical disk 110 is formed by adhering to an adhesive layer 3, surfaces having aluminum film forming areas 112a and 112b made of thin aluminum films on two ring disk-shaped polycarbonate substrates 111a and 111b. Main information is recorded to the aluminum film forming areas 112a and 112b by using laser beams or the like. The main information is read by radiating reading beams which are condensed by a condenser lens 115.

As shown in FIG. 1, a management identifier area 117 of an optical disk lot is provided at a center-side peripheral of the aluminum film forming area 112b to which the main information is recorded, on an inner-circumference portion 118 of the ring disk-shaped polycarbonate substrate 111b. Management information such as title, order name, and lot number is recorded to the management identifier area 117 by printing. In the case of the above recording, linear information upon exposure is recorded to the corresponding area such as a number, a character, and a barcode upon exposing an optical disk stamper, as surface information which can visually be recognized in general. In the manufacturing after exposing the optical disk stamper, a CCD camera or the like identifies and manages the management information. Consequently, it is advantageous to prevent trouble such as the mixing of foreign materials by identifying the above management information.

Further, as disclosed in Japanese Unexamined Patent Application Publication No. 2000-163883, main information is recorded to an optical disk. Additional-information area data is also recorded to the optical disk. In the above-described optical disk, effectively, the copyright of contents is protected and illegal software operation is prevented.

Referring to FIG. 2, an optical disk disclosed in the above Publication will be described in followings. The optical disk 200 has a main-information area 212 and an additional-information area 213 in a substrate 211 thereof. The additional-information area 213 has an area for inhibiting the reading of the recorded data and a control area indicating whether information on the prohibition of reading is present or absent. A reading device of the optical disk 200 does not externally output the information on the prohibition of reading and, therefore, the information on the prohibition of reading is not downloaded when information except therefor is downloaded. As a consequence, the information on the prohibition of reading includes a cipher key for the main information, thereby preventing the normal reading of cipher data which is downloaded. If the information on the prohibition of reading might be read, a manufacturer can find an illegal source by including management information such as an order side in the information on the prohibition of reading.

The optical disk having the conventional individual recognizing function has a problem to erroneously operate the optical disk to which data to be downloaded excluding the main information is recorded.

The management information on each optical disk is not subjected to a specific countermeasure.

In the related art shown in FIG. 1, the optical disk records the management information such as the title, the order-side name, and the lot identification information. In the case that high-priced data contents are installed in a CD-ROM, a management number for each customer is additionally input to the above-described management information. However, actually, each optical disk is not subjected to detailed management. Therefore, an optical disk having another management information might erroneously be operated by inputting the management number of any customer.

In the related art shown in FIG. 2, although the illegal copy and the falsification of the recorded contents are prevented, the management measurement against the downloading of information to an erroneous area is not adopted.

SUMMARY OF THE INVENTION

To solve the above-described problems, it is an object of the present invention to provide an optical disk having an individual recognizing function for effectively managing each optical disk, which is suitable to product management for easily inhibiting the illegal use of manufactured and sold optical disks.

In the present invention, there is provided an optical disk having an individual recognizing function and a ring disk-shaped body, comprising a first substrate having a first principal surface, a second substrate having a second principal surface, an adhesive layer, principally. The adhesive layer is sandwiched between the first principal surface of the first substrate and the second principle surface of the second substrate and to which the first substrate and the second substrate are adhered. And a ring disk-shaped main-information area to which main information is recorded or is read by laser beams, provided on at least one of the first principal surface and the second principal surface. In the above-described optical disk having the individual recognizing function, at least one of the first principal surface and the second principal surface has an individual recognizing area. On the individual recognizing area, identification information for uniquely recognizing the optical disk is recorded before adhering the first substrate and the second substrate. The individual recognizing area is placed to at least one of an inner-circumference portion and an outer-circumference portion adjacent to the main-information area on the substrate. This position exists when the optical disk is perspectively viewed in the vertical direction of the first principal surface and the second principal surface. In the individual recognizing area, after adhering the first substrate and the second substrate to the adhesive layer, the identification information can be read but cannot be recorded and changed by using the laser beams used for recording or reading the main information to the main-information area.

That is, the optical disk in the present invention is formed by adhesion of at least two surfaces used for forming information to the adhesive layer. The optical disk has the individual recognizing area for read only. The individual recognizing area is placed to at least one of an inner-circumference portion and an outer-circumference portion adjacent to the main-information area on the substrate for recording the main information to one of the adhering surfaces. At the individual recognizing area, the identification information for uniquely recognizing the optical disk is recorded.

With the above-described structure, when the optical disk is loaded, the identification information for each optical disk can be uniquely read from the individual recognizing area on the optical disk by using, e.g., the reading beams. Therefore, the downloading destination can certainly be confirmed. It is possible to read the recorded main information by only the reading device having identification information which completely matches the above-described identification information for each optical disk.

That is, the security can be highly ensured by using the management and the identification of each optical disk. Not only by inputting a password but also by combining the identification of the optical disk and the password, a user is determined or authenticated. Simultaneously, the optical disk can safely be used while highly maintaining the confidentiality of data.

Preferably, the above-described identification information may be recorded and formed by printing a pattern having a predetermined difference in tint at the individual recognizing area. With the structure, the printed identification information can be read by the reading beams and, further, can visually be recognized by the difference in tint. Therefore, upon loading, the optical disk can be identified and can be checked in advance.

Preferably, the pattern having the predetermined difference in tint may be at least one of a character, a number, a barcode, and a drawing. Further, preferably, the printing may be any of screen printing, ink-jet printing, offset printing, and ink stamp.

Moreover, with the above-described structure, the identification information for each optical disk is recorded to the individual recognizing area on the substrate surface which is adhered to the adhesive layer by the printing so as to prevent the easy falsification of the optical disk. Thus, the optical disk must be broken to change the data of the optical disk on purpose. Therefore, the above-described structure becomes safe against the falsification.

Preferably, the above-described individual recognizing area may be adjacent to a management area which is provided at a circumference portion of the main-information area. Further, the individual recognizing area can function as a part of the management area.

When two surfaces for forming information are adhered to an adhesive layer, the optical disk may comprise an individual recognizing area for read only on one of the adhering surfaces and a film forming area on the other of the adhering surfaces. At the individual recognizing area, identification information for uniquely recognizing the optical disk is recorded to at least one of an inner-circumference portion and an outer-circumference portion adjacent to a main-information area for recording main information on the surfaces. The film forming area is used for covering the individual recognizing area. Preferably, the film forming area for covering the individual recognizing area may be formed as a part of the main-information area.

With the above-described structure, the film forming area is total reflection or half-transparent, and reaches the back of a reading-beam irradiated surface of the individual recognizing area. Therefore, it is possible to identify with a higher recognizing ratio and with high contrast, the recorded contents having the difference in tint. In particular, advantageously, information such as a printed mark is visually checked.

As mentioned above, advantages of the present invention are as follows.

According to a first advantage, the product management of the optical disk can easily be performed.

Because, in the processing for manufacturing the optical disk, the printing enables the area whose tint can visually be identified, including the character, the number, the barcode, the drawing, etc. to be formed at an area other than the main-information area. Further, the security can effectively be assured by recognizing and collating the formed area with the reading beams or combining the formed area and a specific password after the recognition and collation.

According to a second advantage, the optical disk cannot be falsified.

Because, in the processing for manufacturing the optical disk, the area capable of identifying each optical disk can be formed by the printing before adhesion of substrates. Thus, the data at the formed area of the completed optical disk cannot be falsified. If performing such a falsification that the adhesion of the substrates in the optical disk is peered and new data is recorded, the polycarbonate (PC) substrate is broken or mechanical characteristics are extremely deteriorated because the strength of adhesion is high. The reading of the optical disk becomes impossible. Actually, the optical disk becomes unavailable.

DESCRIPTION OF THE PREFERRED EMBODIMENTS

Figure 1:
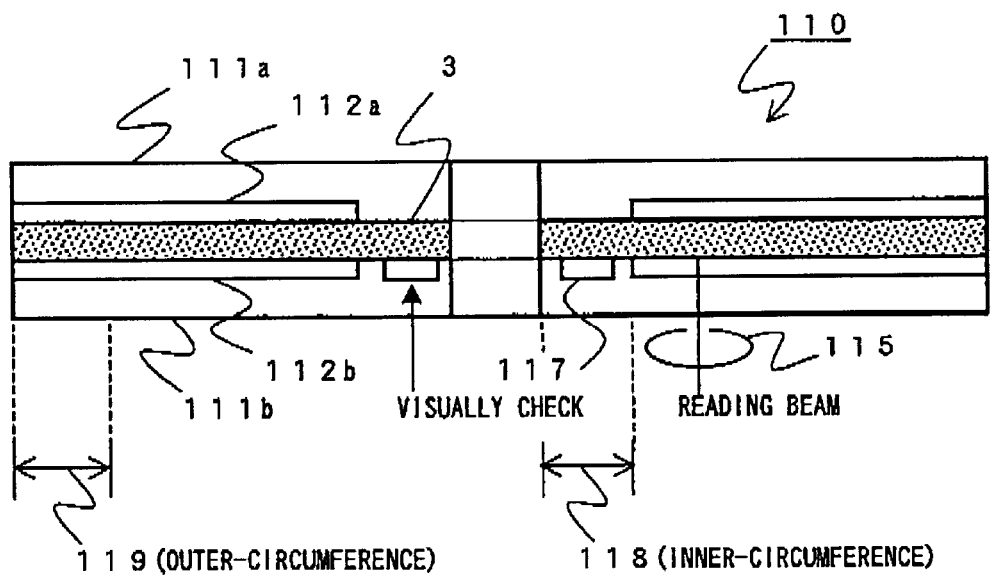
FIG. 1 is a cross-sectional view schematically showing the structure of an optical disk according to one related art.
Figure 2:
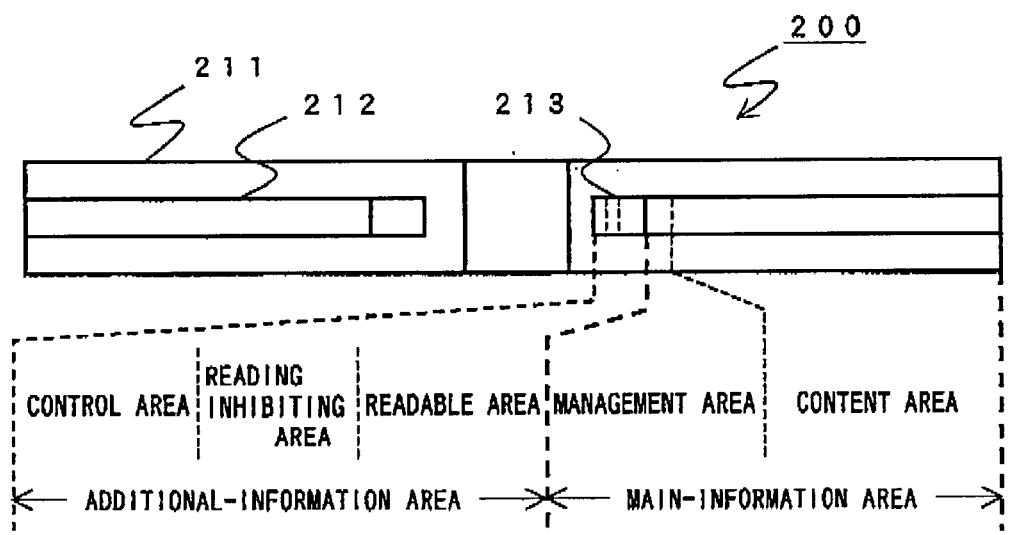
FIG. 2 is a cross-sectional view schematically showing the structure of an optical disk according to another related art.

Next, embodiments of the present invention will be described with reference to the drawings. The drawings are referred to for the sake of description and the sizes of components in the drawings are shown as examples.

Figure 3:
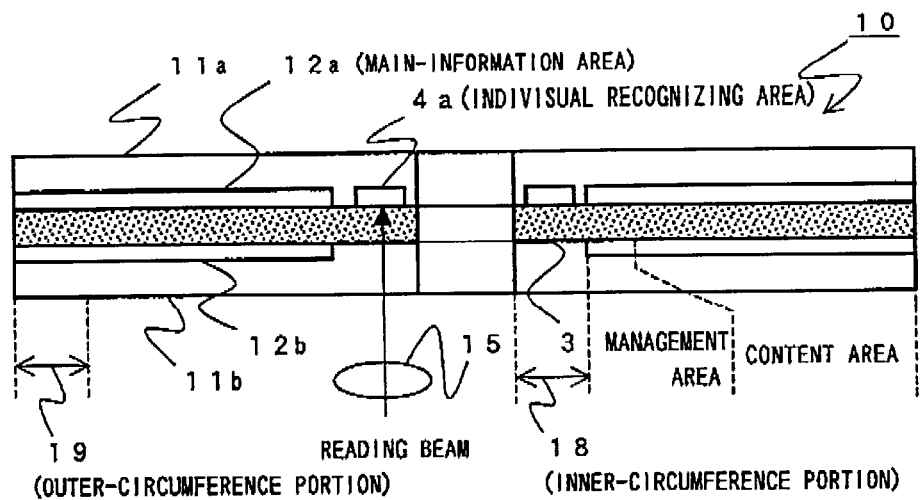
FIG. 3 is a cross-sectional view schematically showing the structure of an optical disk according to a first embodiment of the present invention.

FIG. 3 is a cross-sectional view schematically showing the structure of an optical disk according to a first embodiment of the present invention.

Referring to FIG. 3, an optical disk 10 having a ring and disk-shaped form comprises main-information areas 12a and 12b and an individual recognizing area 4a on adhesive surfaces of substrates 11a and 11b made of two ring disk-shaped polycarbonate (PC) substrates which are adhered to an adhesive layer 3. Unlike the conventional optical disks, the optical disk 10 has the individual recognizing area 4a.

The optical disk 10 is formed by adhesion of the surfaces of the substrates 11a and 11b to the adhesive layer 3 in the center. Reading beams are incident from the substrate 11b side shown in the lower side in the FIG. 3 via a condenser lens 15 and pits on a recording film or on an information area are formed on an inner surface near the incident surface.

The adhesive surfaces of the substrates 11a and 11b include the main-information areas 12a and 12b as film forming areas to which main information is recorded and the individual recognizing area 4a. Each of the main-information areas 12a and 12b comprises a contents area to which data contents are recorded and a management area having a control table (TOC), for managing the content area.

The main-information areas 12a and 12b as the film forming areas to which the main information is recorded correspond to reflecting films. When the optical disk 10 has two layers for reading on one side, the main-information area 12b is a half-transparent film made of e.g., aluminum and the main-information area 12a is a total-reflecting film. Although the adhesive layer 3 is made of UV cure adhesive, slow-cure resin, hot-melt resin, etc., depending on a reading system such as one layer for reading on one side, or two layers for reading on one side.

The individual recognizing area 4a as the feature of the present invention is provided for an inner-circumference portion 18 adjacent to the management area of the main-information area 12a. By using printing, e.g., screen printing, ink-jet printing, offset printing, and ink stamp, it is possible to record to the individual recognizing area 4a, visually recognized data for each optical disk which can be read by reading beams, such as a character, a number, a barcode, a drawing, and tint. The individual recognizing area 4a is formed during processing for manufacturing the optical disk 10 before the adhesion of the substrates. Therefore, the optical disk cannot be falsified by using a strong adhesive.

The condenser lens 15 of a reading device is an objective lens for used for condensing the reading beams and performs focusing servo and tracking servo by using itself. Simultaneously, the main-information areas 12a and 12b are read by the reading beams. Incidentally, a management identifier of the individual recognizing area 4a can be read by using the reading beams. According to the first embodiment, the reading device reads the management identifier of the individual recognizing area 4a by using the reading beams and collates the read management identifier with the identifier in the reading device. And the reading device reads the main-information areas 12a and 12b by using the reading beams only when the read management identifier matches the identifier in the reading device. Further, according to the first embodiment, in the optical disk having the two layers for reading on one side, a common management-identifier can be read in a first layer and a second layer.

Next, the individual recognizing area 4a will be described in detail.

In the manufacturing processing of the optical disk 10, it is possible to record the individual recognizing area 4a such as a character, a number, a barcode, a drawing, and a tint which can be visually recognized, by printing, e.g., screen printing, ink-jet printing, offset printing, and ink stamp. After recognizing and collating the individual recognizing area 4a by using the reading beams, it is checked to see if the individual recognizing area 4a matches predetermined information and, then, the reading or downloading of the optical disk 10 can start. Further, by combining the individual recognizing area 4a and a specific password, the security can effectively be assured.

Further, the optical disk manufactured in the above processing is formed an area which can visually be identified, e.g., a character, a number, a barcode, a drawing, or a tint, before the adhesion of the substrates. And the area is formed by using of printing such as screen printing, ink-jet printing, offset printing, or ink stamp. Therefore, data on the area in the completed optical disk cannot be falsified. If performing such a falsification that the adhesion of the substrates in the optical disk is peered and new data is recorded, the optical disk is broken or mechanical characteristics are extremely deteriorated because the strength of adhesion is high. The reading becomes impossible. Actually, the optical disk becomes unavailable.

Next, with reference to FIG. 4, an optical disk 20 different from the optical disk 10 shown in FIG. 3 will be described.

Figure 4:
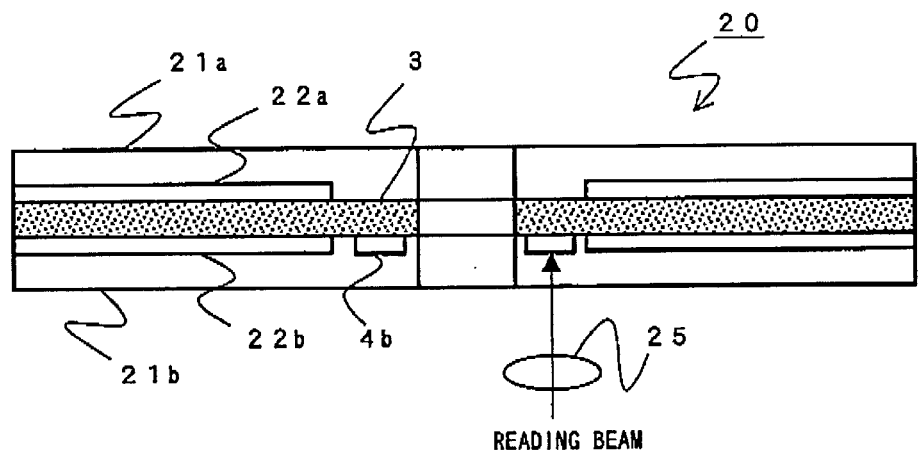
FIG. 4 is a cross-sectional view schematically showing the structure of an optical disk according to a second embodiment of the present invention.

FIG. 4 is a cross-sectional view for explaining the structure of the optical disk 20 according to a second embodiment of the present invention. The structure shown in FIG. 4 is modifying that shown in FIG. 3. Unlike the structure shown in FIG. 3, an individual recognizing area 4b in FIG. 4 is formed to a substrate 21b instead of the substrate 11b shown in FIG. 3 on the incident surface. Other components are the same as those in FIG. 5, and reference numerals 10, 11a, 11b, 12a, 12b, and 15 may be replaced with reference numerals 20, 21a, 21b, 22a, 22b, and 25.

Referring to FIG. 4, the optical disk 20 is formed by adhesion of two ring disk-shaped substrates 21a and 21b to an adhesive layer 3 in the center. Reading beams are incident from the substrate 21b side shown in the lower side in the FIG. 4 via a condenser lens 25 and pits on a recording film or on an information area are formed on the inner surface near an incident surface.

Main-information areas 22a and 22b correspond to film forming areas to which main information is formed. The individual recognizing area 4b is provided at an inner-circumference portion adjacent to the main-information area 22b. By using printing, e.g., screen printing, ink-jet printing, offset printing, and ink stamp, it is possible to record to the individual recognizing area 4b, data which can visually be recognized and can be read by reading beams, such as a character, a number, a barcode, a drawing, and tint. The individual recognizing area 4a is formed during manufacturing processing before the adhesion of the substrates 21a and 21b in the optical disk 20.

Next, an optical disk 30 different from the optical disks 10 and 20 will be described with reference to FIG. 5.

Figure 5:
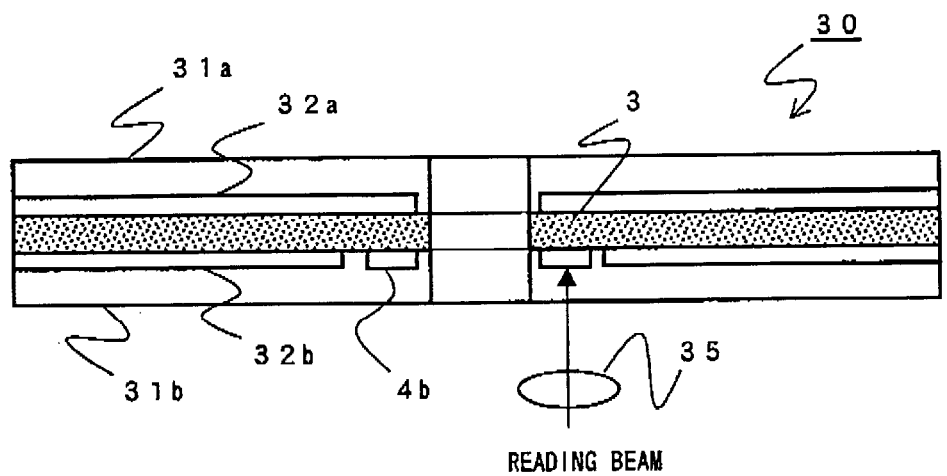
FIG. 5 is a cross-sectional view schematically showing the structure of an optical disk according to a third embodiment of the present invention.

FIG. 5 is a cross-sectional view for explaining the structure of the optical disk 30 according to a third embodiment of the present invention. The structure shown in FIG. 5 is modifying that shown in FIG. 4. Unlike the structure shown in FIG. 4, a main-information area 32a on a substrate 31a side is formed to reach the backside of the individual recognizing area 4b where is an inner-circumference portion of the substrate wider than a main-information area 32b provided for a substrate 31b. With the above-described structure, it is possible to identify with a higher recognizing ratio and high contrast in the individual recognizing area 4b which is formed by the character, the number, the barcode, the drawing, or the tint. The individual recognizing area 4b is recorded by the printing such as the screen printing, the ink-jet printing, the offset printing, or the ink stamp. In particular, the above-described structure becomes effective when information such as a printed mark is visually checked.

Other components are the same as those in FIG. 4 and reference numerals 20, 21a, 21b, 22a, 22b, and 25 may be replaced with reference numerals 30, 31a, 31b, 32a, 32b, and 35.

Referring to FIG. 5, the optical disk 30 is formed by adhesion of the two ring disk-shaped substrates 31a and 31b to an adhesive layer 3 in the center. Reading beams are incident from the substrate 31b side shown in the lower side in FIG. 5 via a condenser lens 35 and pits on a recording film or on an information area are formed on an inner surface near the incident surface.

Main-information areas 32a and 32b correspond to film forming areas to which main information is formed. The individual recognizing area 4b is provided at an inner-circumference portion of the substrate 31b adjacent to the main-information area 32b, within the range of the main-information area 32a.

Next, an optical disk 40 different from the optical disks 10, 20, and 30 will be described with reference to FIG. 6.

Figure 6:
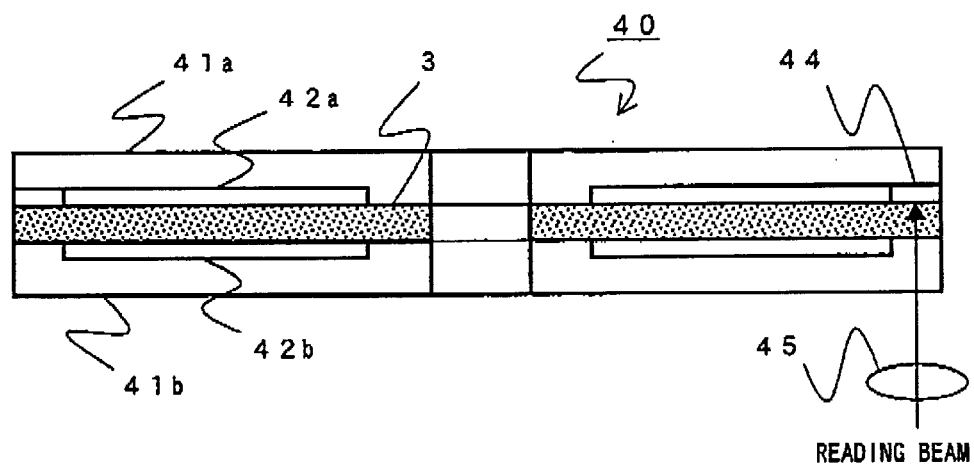
FIG. 6 is a cross-sectional view schematically showing the structure of an optical disk according to a fourth embodiment of the present invention.

FIG. 6 is a cross-sectional view for explaining the structure of the optical disk 40 according to a fourth embodiment of the present invention. The structure shown in FIG. 6 is modifying that shown in FIG. 3. Unlike the structure shown in FIG. 3, an individual recognizing area 44 on a substrate 41b side shown in FIG. 6 is formed at an outer-circumference portion adjacent to a main-information area 42a on a substrate 41a. Other components are the same as those in FIG. 3 and reference numerals 10, 11a, 11b, 12a, 12b, and 15 may be replaced with reference numerals 40, 41a, 41b, 42a, 42b, and 45.

Referring to FIG. 6, the optical disk 40 is formed by adhesion of the two ring disk-shaped substrates 41a and 41b to an adhesive layer 3 in the center. Reading beams are incident from the substrate 41b side shown in the lower side in the FIG. 6 via a condenser lens 45 and pits on a recording film or on an information area are formed on an inner surface near the incident surface.

Main-information areas 42a and 42b correspond to film forming areas to which main information is formed. The individual recognizing area 44 is provided at an outer-circumference portion adjacent to the main-information area 42a on the substrate 41a. By using printing, e.g., screen printing, ink-jet printing, offset printing, and ink stamp, it is possible to record to the individual recognizing area 44, visually recognized data for each optical disk such as a character, a number, a barcode, a drawing, and tint. The individual recognizing area 44 is formed during manufacturing processing before the adhesion of the substrates 41a and 41b in the optical disk 40.

Since the individual recognizing area is formed not at the inner-circumference portion on the substrate of the optical disk but at the outer-circumference portion, the management area of the optical disk is not necessarily limited to the inner-circumference portion. That is, in the case of the optical disk having the two layers for reading on one side, the management area can be formed at an outer-circumference portion relative to a middle area. The middle area is formed when a first layer (L0) and a second layer (L1) on the incident surface side are sequentially read (oppositely read).

Figure 7:
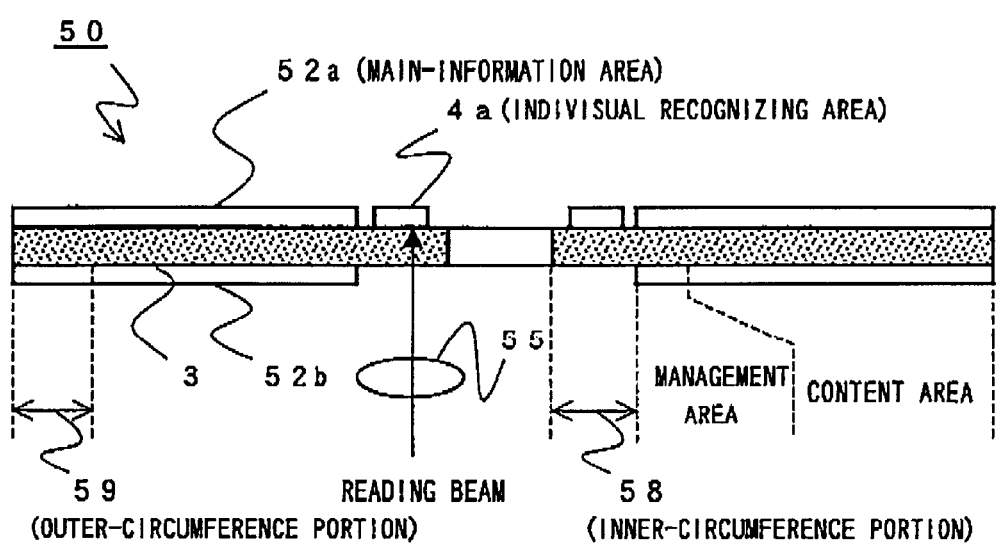
FIG. 7 is a cross-sectional view schematically showing the structure of an optical disk according to a fifth embodiment of the present invention.

Referring to FIG. 7, an optical disk 50 comprises surfaces 52a and 52b and an individual recognizing area 4a on an adhesive layer 3. Unlike the optical disks mentioned above, the optical disk 50 has not any substrate.

The optical disk 50 is formed by adhesion of the surfaces 52a and 52b to the adhesive layer 3 in the center. The other portions are the same as one shown in FIG. 3. The surfaces 52a and 52b are the main-information areas as film forming areas to which main information is recorded. The individual recognizing area 4a as the feature of the present invention is provided for an inner-circumference portion 58 adjacent to the management area of the main-information area 52a.

In the case of the optical disk having no adhesion of the substrates such as a CD-ROM, as compared with the above-described management for each optical disk before the adhesion of the substrates, the security against the data falsification is not so higher. However, the optical disk can similarly be formed by use of specific ink or the like. In this case, after forming the above-described management area at the inner-circumference portion or the outer-circumference portion of the data area, UV cure adhesive can be applied.

Furthermore, a system comprising the above-mentioned optical disk and a reading device is provided. In this system, the reading device reads the identification information on the individual recognizing area on the optical disk by using the laser beams. The reading device checks to see if the read identification information on the optical disk matches the identification information in the reading device. And the reading device reads the main information on the main-information area on the optical disk only when the identification information on the optical disk matches the identification information therein.

What is claimed is:

1. An optical disk having an individual recognizing function, said optical disk comprising:

a first substrate having a first principal surface;

a second substrate having a second principal surface;

an adhesive layer which is sandwiched between the first principal surface of said first substrate and the second principle surface of said second substrate, and to which said first substrate and said second substrate are adhered; and a ring disk-shaped main-information area to which main information is recorded or is read by laser beams, said ring disk-shaped main-information area being provided on at least one of said first principal surface and said second principal surface, wherein at least one of said first principal surface and said second principal surface has an individual recognizing area to which identification information for uniquely recognizing said optical disk is recorded to at least one of an inner-circumference portion and an outer-circumference portion relative to said main-information area on said substrates when said optical disk is perspectively viewed in the vertical direction of said first principal surface and said second principal surface, before adhering said first substrate and said second substrate, and in said individual recognizing area, after adhering said first substrate and said second substrate to said adhesive layer, said identification information can be read but cannot be recorded and changed by using the laser beams used for recording or reading the main information of said main-information area.

2. An optical disk having an individual recognizing function according to claim 1, wherein said identification information is a pattern having a predetermined difference in tint and being recorded and formed to said individual recognizing area by printing.

3. An optical disk having an individual recognizing function according to claim 2, wherein the pattern having the predetermined difference in tint is at least one of a character, a number, a barcode, and a drawing.

4. An optical disk having an individual recognizing function according to claim 2, wherein said printing is any of screen printing, ink-jet printing, offset printing, and ink stamp.

5. An optical disk having an individual recognizing function according to claim 1, wherein said individual recognizing area is adjacent to a management area which is provided at a peripheral portion of said main-information area.

6. An optical disk having an individual recognizing function according to claim 5, wherein said individual recognizing area functions as a part of said management area.

7. An optical disk having an individual recognizing function, said optical disk comprising an adhesive layer and at least two surfaces for forming information, which are adhered to said adhesive layer and are formed, further comprising:

an individual recognizing area for read only, on which identification information for uniquely recognizing said optical disk is recorded to at least one of said two adhering surfaces and at least one of an inner-circumference portion and an outer-circumference portion relative to a main-information area.

8. An optical disk having an individual recognizing function according to claim 7, wherein said identification information is a pattern having a predetermined difference in tint and being recorded and formed to said individual recognizing area by printing.

9. An optical disk having an individual recognizing function according to claim 8, wherein the pattern having the predetermined difference in tint is at least one of a character, a number, a barcode, and a drawing.

10. An optical disk having an individual recognizing function according to claim 8, wherein said printing is any of screen printing, ink-jet printing, offset printing, and ink stamp.

11. An optical disk having an individual recognizing function according to claim 7, wherein said individual recognizing area is adjacent to a management area which is provided at a peripheral portion of said main-information area.

12. An optical disk having an individual recognizing function according to claim 11, wherein said individual recognizing area functions as a part of said management area.

13. An optical disk having an individual recognizing function, said optical disk comprising:

an adhesive layer;

two surfaces for forming information, which are adhered to said adhesive layer and are formed;

an individual recognizing area for read only, to which identification information for uniquely recognizing said optical disk is recorded to at least one of an inner-circumference portion and an outer-circumference portion adjacent to said main-information area for recording main information on one of said two adhering surfaces; and a film forming area for covering said individual recognizing area on the other of said two adhering surfaces.

14. An optical disk having an individual recognizing area according to claim 13, wherein said film forming area for covering said individual recognizing area on said optical disk is formed as a part of said main-information area.

15. A system, comprising:

a optical disk having a first substrate having a first principal surface, a second substrate having a second principal surface, an adhesive layer which is sandwiched between the first principal surface of said first substrate and the second principle surface of said second surface, and to which said first substrate and said second substrate are adhered, and a ring disk-shaped main-information area to which main information is recorded or is read by laser beams, said ring disk-shaped main-information area being provided on at least one of said first principal surface and said second principal surface; and a reading device for reading said optical disk by using the laser beams, and wherein said optical disk further comprises an individual recognizing area to which identification information for uniquely recognizing said optical disk is recorded to at least one of an inner-circumference portion and an outer-circumference portion adjacent to said main-information area on one of said substrates when said optical disk is perspectively viewed in the vertical direction of said first principal surface and said second principal surface, on at least one of said first principal surface and said second principal surface, before adhering said first substrate and said second substrate, in said individual recognizing area, after adhering said first substrate and said second substrate to said adhesive layer, said identification information can be read but cannot be recorded and changed by using the laser beams used for recording or reading the main information to said main-information area, and said reading device reads said identification information on said individual recognizing area on said optical disk by using the laser beams, checks to see if the read identification information on said optical disk matches the identification information in said reading device, and reads the main information on said main-information area on said optical disk only when the identification information on said optical disk matches the identification information in said reading device.

* * * * *